(12) United States Patent
Wang et al.

(10) Patent No.: US 11,952,957 B2
(45) Date of Patent: Apr. 9, 2024

(54) ENGINE AND VEHICLE HAVING THE SAME

(71) Applicant: BYD COMPANY LIMITED, Guangdong (CN)

(72) Inventors: Qiang Wang, Shenzhen (CN); Nan Zhang, Shenzhen (CN); Shiyi Pan, Shenzhen (CN); Shuguang Zhang, Shenzhen (CN); Peng Guo, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/214,429

(22) Filed: Jun. 26, 2023

(65) Prior Publication Data

US 2023/0332556 A1  Oct. 19, 2023

Related U.S. Application Data

(63) Continuation of application No. PCT/CN2022/073200, filed on Jan. 21, 2022.

(30) Foreign Application Priority Data

Mar. 1, 2021 (CN) .......................... 202110226757.2

(51) Int. Cl.
  *F02F 1/42* (2006.01)
  *F02F 3/28* (2006.01)
  *F02F 1/24* (2006.01)
(52) U.S. Cl.
  CPC .......... *F02F 1/4214* (2013.01); *F02F 1/4285* (2013.01); *F02F 3/28* (2013.01); *F02F 1/242* (2013.01); *F02F 2001/245* (2013.01)

(58) Field of Classification Search
  CPC ........ F02F 1/4214; F02F 1/4285; F02F 1/242; F02F 1/42; F02F 1/4235; F02F 3/28;
  (Continued)

(56) References Cited

FOREIGN PATENT DOCUMENTS

| CN | 106640338 A | 5/2017 |
|----|-------------|--------|
| CN | 106870120 A | 6/2017 |

(Continued)

OTHER PUBLICATIONS

International Search Report and Written Opinion for Application No. PCT/CN2022/073200, dated Apr. 26, 2022, 10 pages.

*Primary Examiner* — Hai H Huynh

(57) ABSTRACT

An engine includes a cylinder block, a cylinder head, and a piston. The cylinder head is connected to the cylinder block. The piston is movably connected to the cylinder block. The cylinder block, the cylinder head, and the piston form a combustion chamber. The cylinder head includes an intake valve hole and an exhaust valve hole. An intake valve is disposed at the intake valve hole and an exhaust valve is disposed at the exhaust valve hole. A barrier protrusion is protruded at the edge of the intake valve hole away from the exhaust valve hole. The included angle between a first connecting line connecting a first end of the barrier protrusion and a center of the intake valve hole and a second connecting line connecting a second end of the barrier protrusion and the center of the intake valve hole is greater than 120 degrees and less than or equal to 180 degrees.

18 Claims, 17 Drawing Sheets

(58) Field of Classification Search
CPC .... F02F 2001/245; Y02T 10/12; F02B 31/04; F02B 23/08
USPC ............ 123/302, 306, 307, 308, 298, 193.5
See application file for complete search history.

(56) References Cited

FOREIGN PATENT DOCUMENTS

| | | | |
|---|---|---|---|
| CN | 207777011 U | 8/2018 | |
| CN | 109281750 A | 1/2019 | |
| CN | 109538369 A | 3/2019 | |
| EP | 0554235 A1 | 8/1993 | |
| JP | 2002089266 A | 3/2002 | |
| JP | 2004293484 | * 10/2004 | ................ F02F 3/28 |
| KR | 20020050146 A | 6/2002 | |

* cited by examiner

US 11,952,957 B2

ENGINE AND VEHICLE HAVING THE SAME

CROSS-REFERENCE TO RELATED APPLICATION

This application is a Continuation Application of International Patent Application No. PCT/CN2022/073200, filed on Jan. 21, 2022, which is based on and claims priority to and benefits of Chinese Patent Application No. 202110226757.2, filed on Mar. 1, 2021. The entire content of all of the above-referenced applications is incorporated herein by reference.

FIELD

The present disclosure relates to the field of engines, and more particularly, to an engine and a vehicle having the same.

BACKGROUND

In existing engines, the turbulent kinetic energy is weak at the edge of the combustion chamber, which is unfavorable for flame propagation. Furthermore, the top edge of the piston is relatively flat, and as the edge is located the farthest from the ignition position, the engine is relatively prone to knocks when the combustion speed is low, which is unfavorable for improvement in thermal efficiency of the engine.

SUMMARY

The present disclosure overcomes the disadvantages of the related art mentioned above by proving an engine and a vehicle having the same, the engine having high thermal efficiency.

The present disclosure discloses the following technical solutions. An engine includes a cylinder block, a cylinder head and a piston. The cylinder head is connected to the cylinder block. The piston is movably connected to the cylinder block. The cylinder block, the cylinder head, and the piston form a combustion chamber.

The cylinder head includes an intake valve hole and an exhaust valve hole. An intake valve is disposed at the intake valve hole and an exhaust valve is disposed at the exhaust valve hole. A barrier protrusion is protruded at the edge of the intake valve hole away from the exhaust valve hole. The included angle between a first connecting line connecting a first end of the barrier protrusion and a center of the intake valve hole and a second connecting line connecting a second end of the barrier protrusion and the center of the intake valve hole is greater than about 120 degrees and less than or equal to about 180 degrees.

In an embodiment, the gap between the outer circumference of the intake valve and the barrier protrusion is about 0.5 mm to about 1 mm.

In an embodiment, the height by which the intake valve is protruded from the intake valve hole is the head height of the intake valve. The distance between halfway of the head height of the intake valve and the end surface of the barrier protrusion in the direction of the axis of the intake valve is about 2 mm to about 3 mm.

In an embodiment, at least two combustion chambers are provided. For each of the at least two combustion chambers, the cylinder head includes a spark plug hole, two intake valve holes, and two exhaust valve holes.

For each of the at least two combustion chambers, the two intake valve holes are adjacent to each other on a first side of the spark plug hole at a center of the combustion chamber, the two exhaust valve holes are adjacent to each other on a second side of the spark plug hole at the center of the combustion chamber, and barrier protrusions are disposed on the two intake valve holes symmetrically.

In an embodiment, a straight line passing through centers of the two intake valve holes is a reference axis, the barrier protrusions are located on a side of the reference axis away from the exhaust valve holes, and ends of the barrier protrusions are at a same side of the reference axis.

In an embodiment, a first end of a first barrier protrusion at a first intake valve hole is close to a second intake valve hole, a second end of the first barrier protrusion at the first intake valve hole is away from the second intake valve hole, and a vertical distance from the first end of the first barrier protrusion to the reference axis is greater than a vertical distance from the second end of the first barrier protrusion to the reference axis.

In an embodiment, the cylinder head includes at least two measurement platforms.

In an embodiment, a squishing and guiding structure is disposed on the top surface of the piston.

In an embodiment, the squishing and guiding structure is protruded with respect to an upper reference plane of the piston.

The squishing and guiding structure comprises a first squishing and guiding surface and a second squishing and guiding surface disposed along a first direction, the first squishing and guiding surface is closer to the intake valve than the second squishing and guiding surface, and the second squishing and guiding surface is closer to the exhaust valve than the first squishing and guiding surface.

The squishing and guiding structure comprises a first squishing and guiding protruded structure and a second squishing and guiding protruded structure disposed along a second direction.

The first direction is perpendicular to the second direction.

In an embodiment, a pit structure is disposed on a top surface of the squishing and guiding structure. The pit structure is located between the first squishing and guiding protruded structure and the second squishing and guiding protruded structure.

In an embodiment, the first squishing and guiding surface and the second squishing and guiding surface are of a sloped shape or a curved shape.

An intake valve avoidance structure is disposed on the first squishing and guiding surface.

In an embodiment, when the piston moves to the top dead center, the squishing and guiding structure extends into the combustion chamber of the cylinder head, and a minimum distance between the first squishing and guiding protruded structure and a side wall of a corresponding combustion chamber of the cylinder head and a minimum distance between the second squishing and guiding protruded structure and a side wall of a corresponding combustion chamber of the cylinder head are both about 1 mm to about 2 mm.

In an embodiment, the minimum distance between the first squishing and guiding protruded structure and the cylinder head is equal to the minimum distance between the second squishing and guiding protruded structure and the side wall of the corresponding combustion chamber of the cylinder head. The minimum distance between the first squishing and guiding protruded structure and the side wall of the corresponding combustion chamber of the cylinder head may be about 1.56 mm. The minimum distance between the second squishing and guiding protruded structure and the side wall of the corresponding combustion chamber of the cylinder head may be about 1.56 mm.

In an embodiment, the upper reference plane is of a planar shape. The included angle between the outer side of the first squishing and guiding protruded structure and the upper reference plane is a first included angle and the included angle between an outer side of the second squishing and guiding protruded structure and the upper reference plane is a second included angle. Each of the first included angle and the second included angle is about 100 degrees to about 120 degrees.

In an embodiment, the first included angle is equal to the second included angle. The first included angle may be about 112.5 degrees, and the second included angle may be about 112.5 degrees.

In an embodiment, the vertical distance between the top surface of the first squishing and guiding protruded structure and the upper reference plane of the piston is a first height, a vertical distance between a top surface of the second squishing and guiding protruded structure and the upper reference plane of the piston is a second height, and each of the first height and the second height is about 4 mm to about 6 mm.

In an embodiment, the first height is equal to the second height. The first height may be about 4.9 mm, and the second height may be about 4.9 mm.

In an embodiment, a spark plug is connected to the cylinder head and the distance between the bottom of the pit structure and the spark plug is about 5.5 mm to about 6 mm.

In an embodiment, the bottom of the pit structure is of a smooth curve shape along the cross section perpendicular to the first direction, and the bottom of the pit structure is of a flattened shape along the cross section perpendicular to the second direction.

In an embodiment, the first squishing and guiding surface and the second squishing and guiding surface are of a sloped shape, the upper reference plane of the piston is of a planar shape, an included angle between the first squishing and guiding surface and the upper reference plane of the piston is a third included angle, an included angle between the second squishing and guiding surface and the upper reference plane of the piston is a fourth included angle, and each of the third included angle and the fourth included angle is about 160 degrees to about 170 degrees.

In an embodiment, the third included angle may be about 163 degrees, and the fourth included angle may be about 162 degrees.

In an embodiment, the center of the squishing and guiding structure is offset from the center of the piston toward the exhaust valve in the first direction.

The present disclosure further provides a vehicle including the engine described above.

In the engine and the vehicle having the engine according to present disclosure, a barrier protrusion disposed at the intake valve hole serves to impede and guide the air flow, so that the tumble effect of the air flow in the combustion chamber is improved, resulting in a high tumble ratio, so that the combustion speed is increased, more complete combustion is achieved, and the after-combustion period is shortened, thereby facilitating improvement in the thermal efficiency of the engine. Moreover, the squishing and guiding structure of the piston provides reasonable tumble and swirl, and the pit structure on the top of the squishing and guiding structure, while participating in squishing and guiding, provides a reasonable ignition gap for the side electrode of the spark plug, which facilitates formation of the flame core and stability of the ignited gas mixture. The squishing and guiding structure increases the turbulent kinetic energy at the edge of the combustion chamber, so that the combustion speed is increased and the tendency of knock of an engine of high compression ratio is mitigated. Meanwhile, the barrier protrusion structure provided on the cylinder head increases the tumble ratio and consequently increases the combustion speed. With both configurations, the after-combustion period is shortened, and the thermal efficiency of the engine is improved.

BRIEF DESCRIPTION OF THE DRAWINGS

To describe the technical solutions in the embodiments of the present disclosure more clearly, the accompanying drawings required for describing the embodiments will be described briefly below. Apparently, the accompanying drawings described below show only some embodiments of the present disclosure, and other drawings can be obtained by those of ordinary skill in the art from these accompanying drawings without creative efforts.

DETAILED DESCRIPTION

Figure 1:
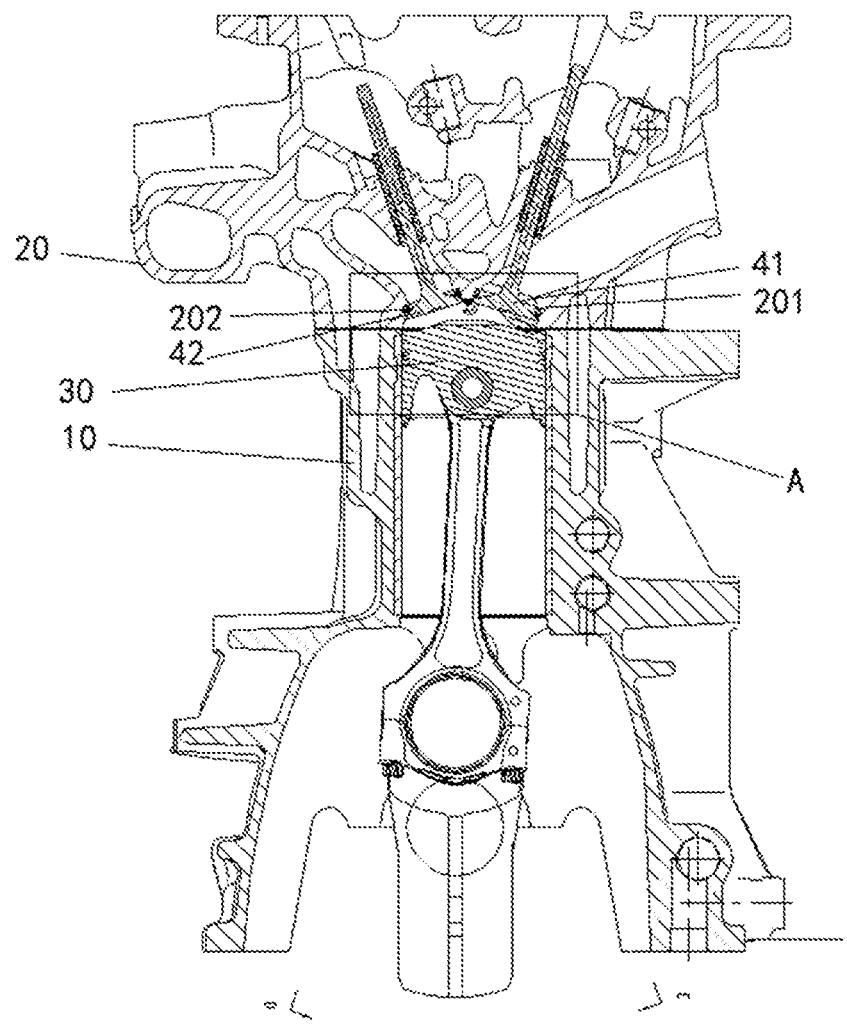
FIG. 1 is a schematic sectional view of an engine according to an embodiment of the present disclosure.
Figure 2:
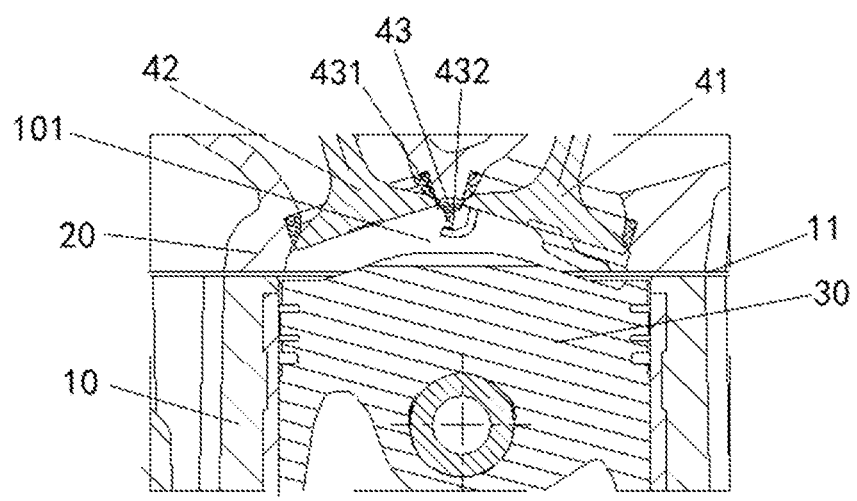
FIG. 2 is a schematic partial enlarged view of part A in FIG. 1.

To make the objects, technical solutions, and advantages of the present disclosure clearer, the present disclosure will be described in further detail with reference to accompanying drawings and embodiments. It should be understood that the embodiments described herein are merely to explain the present disclosure instead of limiting the present disclosure.

It should be noted that, when an element is referred to as being "fixed to" or "provided on" another element, the element may be directly on the other element, or an intermediate element may exist between the element and the other element. When an element is referred to as being "connected to" another element, the element may be directly connected to the other element, or an intermediate element may exist between the element and the other element.

It should also be noted that, the orientation expressions "left", "right", "upper", "lower" or the like in the embodiments of the present disclosure are used merely in a mutually relative conception or with reference to the normal state of use of the product and shall not be regarded as limitation.

As shown in FIG. 1 to FIG. 4 and FIG. 8, an embodiment of the present disclosure provides an engine. The engine includes a cylinder block 10, a cylinder head 20, and a piston 30. The cylinder head 20 is fixedly connected to the cylinder block 10 and the piston 30 is movably connected to the cylinder block 10. The cylinder block 10, the cylinder head 20 and the piston 30 form a combustion chamber 101. The cylinder head 20 includes an intake valve hole 201 and an exhaust valve hole 202. An intake valve 41 is disposed at the intake valve hole 201 and an exhaust valve 42 is disposed at the exhaust valve hole 202. A protruded barrier protrusion 21 is disposed at the edge of the intake valve hole 201 away from the exhaust valve hole 202. An included angle T between a first connecting line connecting a first end of the barrier protrusion 21 and a center of the intake valve hole 201 and a second connecting line connecting a second end of the barrier protrusion and the center of the intake valve hole (i.e., the central angle for the barrier protrusion 21, also called wrap angle) is greater than about 120 degrees and less than or equal to about 180 degrees. The barrier protrusion 21 has a certain height and forms a kind of barrier in combination with the head of the intake valve 41. The barrier protrusion 21 serves to impede and guide the air flow, so that the tumble effect of the air flow in the cylinder (the combustion chamber 101) is improved, resulting in a high tumble ratio, so that the combustion speed is increased, more complete combustion is achieved, and the after-combustion period is shortened, thereby facilitating improvement in the thermal efficiency of the engine.

Figure 6:
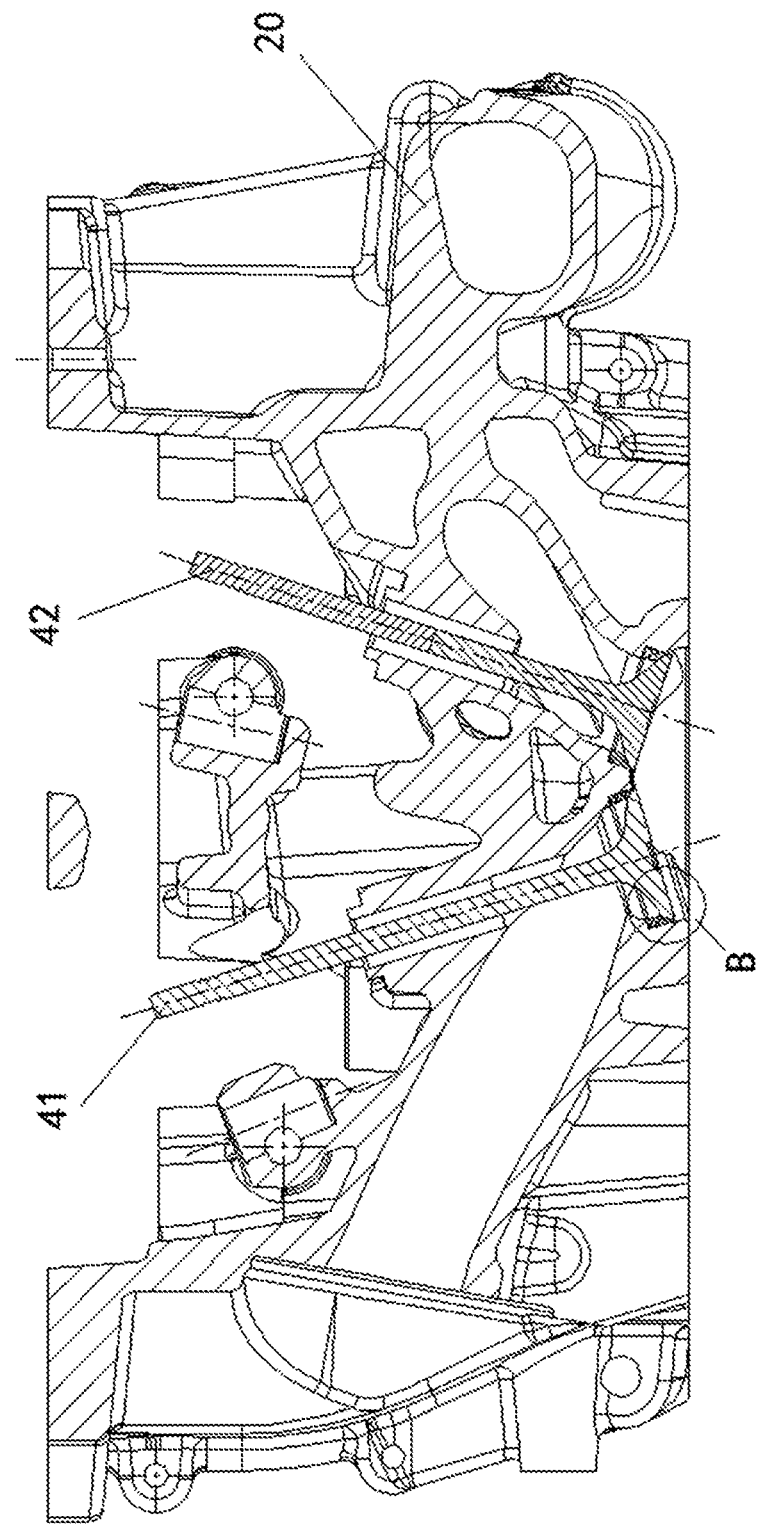
FIG. 6 is a schematic sectional view of a cylinder head in an engine according to an embodiment of the present disclosure.
Figure 7:
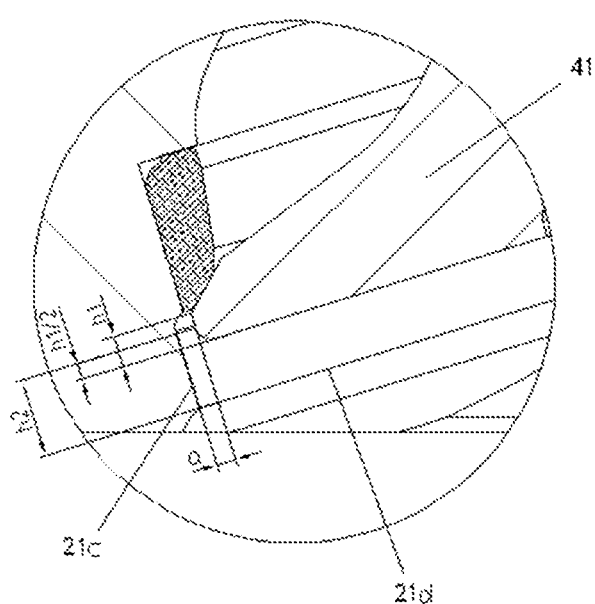
FIG. 7 is a schematic partial enlarged view of part B in FIG. 6.

In an embodiment, as shown in FIG. 6 and FIG. 7, the gap a between the outer circumference of the intake valve 41 and the barrier protrusion 21 is about 0.5 mm to about 1 mm, which facilitates increasing the tumble ratio.

In an embodiment, as shown in FIG. 6 and FIG. 7, the side wall of the barrier protrusion 21 is denoted by 21c in FIG. 7 and the end surface of the barrier protrusion 21 is denoted by 21d. The height by which the intake valve 41 is protruded from the intake valve hole 201 is the head height h1 of the intake valve 41. The distance h2 between halfway of the head height of the intake valve 41 (h1 divided by 2, i.e., h1/2) and the end surface of the barrier protrusion 21 in the direction of the axis of the intake valve 41 is about 2 mm to about 3 mm, resulting in a better tumble effect of the air flow in the cylinder.

In an embodiment, in an engine, at least two combustion chambers 101 are provided. The cylinder head 20 includes two of the intake valve holes 201 and two of the exhaust valve holes 202 for each of the combustion chambers 101.

The two intake valve holes 201 are disposed adjacent to each other on one side of the center of the combustion chamber 101, and the two exhaust valve holes 202 are disposed adjacent to each other on the other side of the center of the combustion chamber 101. A spark plug hole 203 may be disposed on the cylinder head 20 at a position corresponding to the center of the combustion chamber 101. The barrier protrusions 21 at the two intake valve holes 201 for the same combustion chamber 101 are arranged/disposed symmetrically relative to each other, which provides a better impedance and guidance of the air flow.

Figure 3:
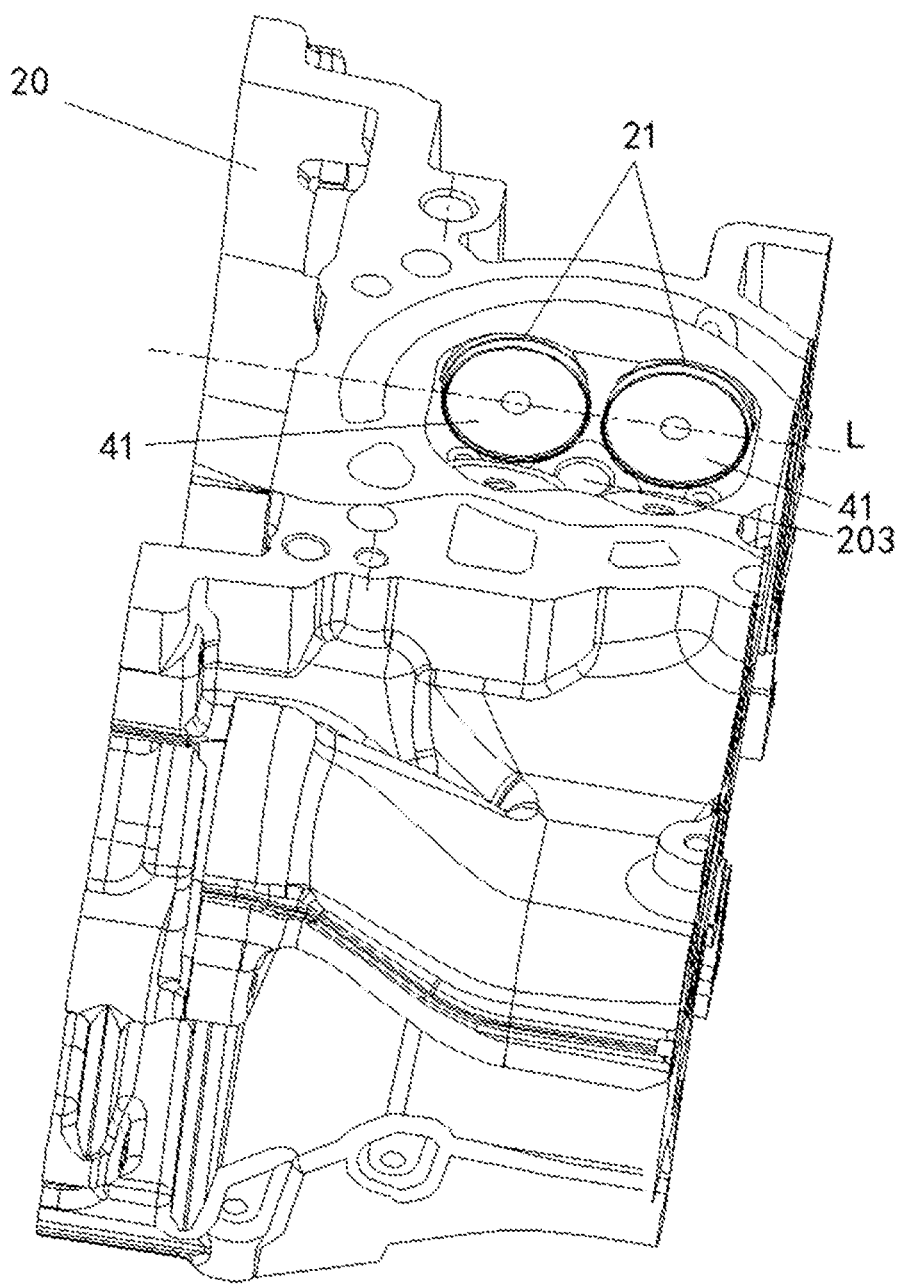
FIG. 3 is a schematic perspective view of a cylinder head in an engine according to an embodiment of the present disclosure.
Figure 4:
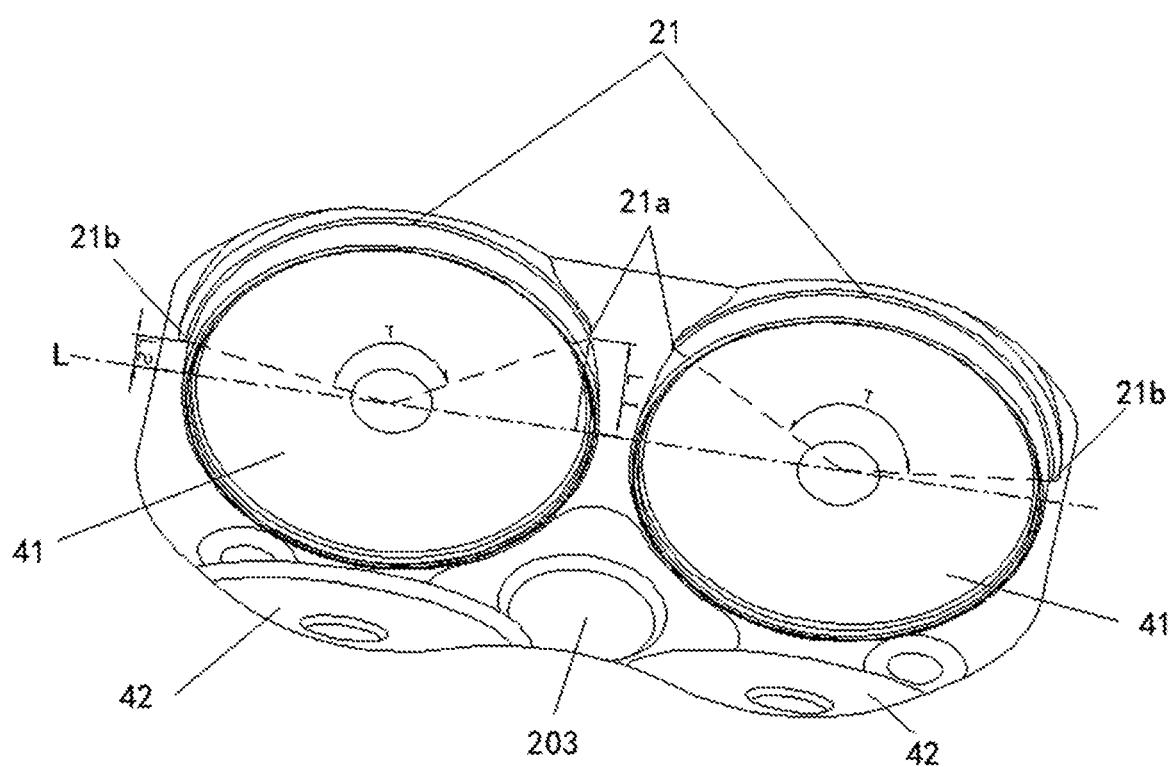
FIG. 4 is a schematic partial enlarged view of an intake valve hole of a cylinder head in FIG. 3.

In an embodiment, as shown in FIG. 3 and FIG. 4, the straight line passing through the centers of the two intake valve holes 201 is used as the reference axis L for the same combustion chamber 101. The barrier protrusion 21 is located on the side of the reference axis L away from the exhaust valve hole 202 and both end of the barrier protrusion 21 are at the same side of the reference axis L, resulting in a reasonable structure. The two intake valve holes 201 of the same combustion chamber 101 may be arranged/disposed along the direction from the front end to the back end of the engine. Accordingly, the two exhaust valve holes 202 of the same combustion chamber 101 may also be arranged/disposed along the direction from the front end to the back end of the engine.

Figure 5A:
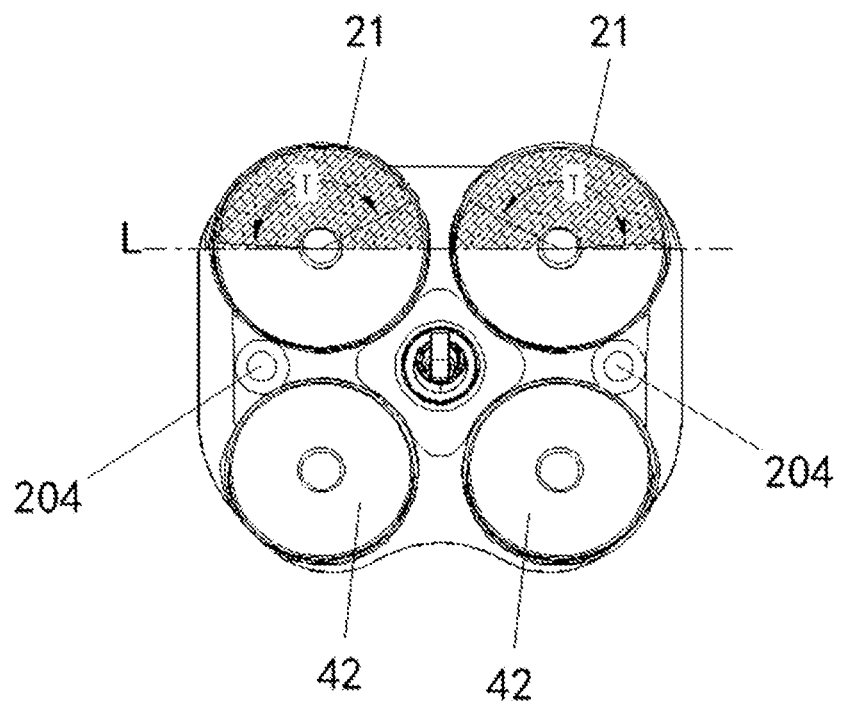
FIG. 5(a) is a schematic plan view of intake and exhaust valve holes of a cylinder head in an engine according to an embodiment of the present disclosure.
Figure 5B:
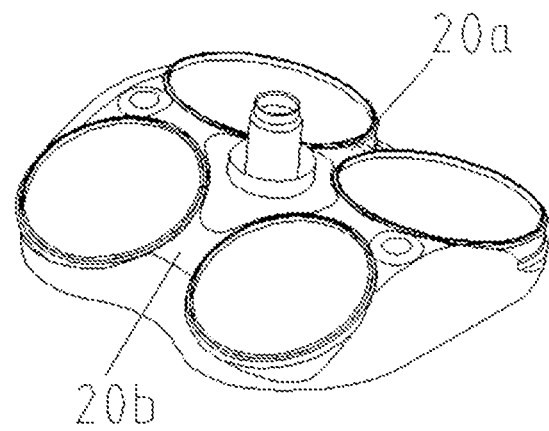
FIG. 5(b) is a schematic perspective view of a combustion chamber of a cylinder head (the portion of the combustion chamber in the cylinder head) in an engine according to an embodiment of the present disclosure.
Figure 9:
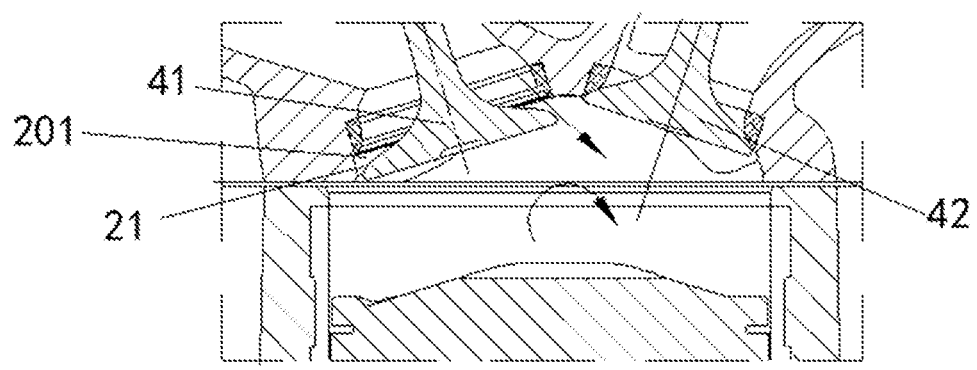
FIG. 9 is a schematic partial enlarged view of part C in FIG. 8.

In an embodiment, as shown in FIG. 3 and FIG. 4, one end of the barrier protrusion 21 of a first intake valve hole is the first end 21a and the other end of the barrier protrusion 21 is the second end 21b. The first end 21a of the barrier protrusion 21 is close to the other corresponding intake valve hole 201 (e.g., a second intake valve hole for the same combustion chamber 101) and the vertical distance L1 between the first end 21a of the barrier protrusion 21 and the reference axis L is greater than the vertical distance L2 between the second end 21b of the barrier protrusion 21 and the reference axis L. That is, the barrier protrusion 21 as a whole may be biased toward the outside. As shown in FIG. 5(a), the wrap angle of the barrier protrusion 21 is inside the shaded region (with gridded hatches). The left to right direction in FIG. 5(a) represents the direction from the front side to the rear side of the engine. The direction of the reference line L in FIG. 4 represents the direction from the front side to the rear side of the engine. FIG. 5(b) shows a perspective view of a combustion chamber of the cylinder head. In this figure, 20a represents a portion close to the intake side and 20b represents a portion close to the exhaust side. Through ingenious configuration of the range of the wrap angle of the barrier protrusion 21, the intake valve 41 is enabled to improve the tumble effect of the air flow in the cylinder (such as the direction of tumble of the air flow represented by the arrow in FIG. 9) during the small valve lift and consequently increase the combustion speed.

Figure 10:
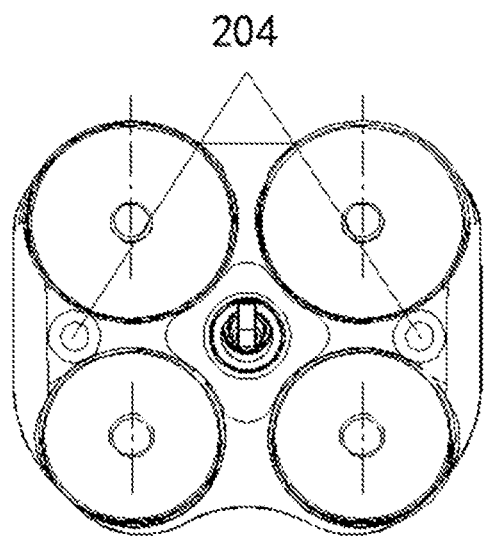
FIG. 10 is a schematic partial plan view of a cylinder head in an engine according to an embodiment of the present disclosure.
Figure 11:
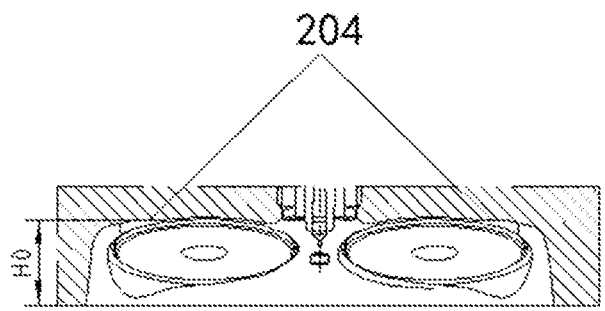
FIG. 11 is a schematic partial sectional view of a cylinder head in an engine according to an embodiment of the present disclosure.

In an embodiment, at least two measurement platforms 204 are disposed on the cylinder head 20. The at least two measurement platforms 204 are disposed on the two sides to the center of the combustion chamber 101 (i.e., the two sides of the spark plug hole 203) respectively. The surface of the combustion chamber of the cylinder head may be a cast blank surface. To ensure the accurate measurement of the volume of the combustion chamber 101, the cylinder head 20 in this embodiment, as shown in FIG. 10 and FIG. 11, is designed to have two measurement platforms 204 inside. In the process of production, the volume of the combustion chamber 101 can be indirectly controlled by measuring the height H0 from the measurement platforms 204 to the end surface of the cylinder head 20, so that unqualified products can be prevented from being released.

In an embodiment, a cylinder gasket 11 may be disposed between the cylinder head 20 and the cylinder block 10. The cylinder block 10 includes a cylinder bore side wall 102. The spark plug 43 may be disposed at the central position of the combustion chamber of the cylinder head. The spark plug 43 includes a central electrode 431 and a side electrode 432.

In an embodiment, as shown in FIG. 12 to FIG. 17, a squishing and guiding structure is disposed on the top of the piston 30 to further improve the tumble effect of the air flow in the cylinder (the combustion chamber 101).

Figure 12:
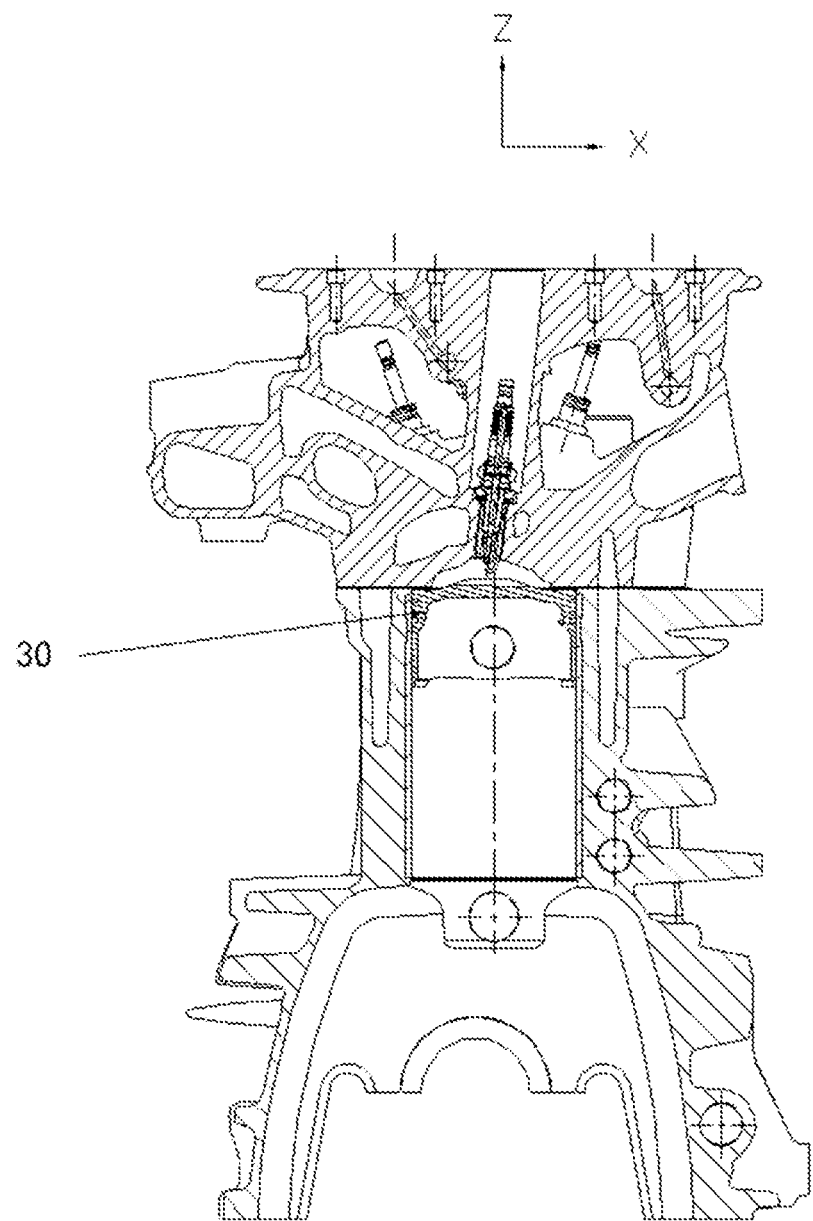
FIG. 12 is a schematic sectional view of an engine perpendicular to a second direction according to an embodiment of the present disclosure.
Figure 13:
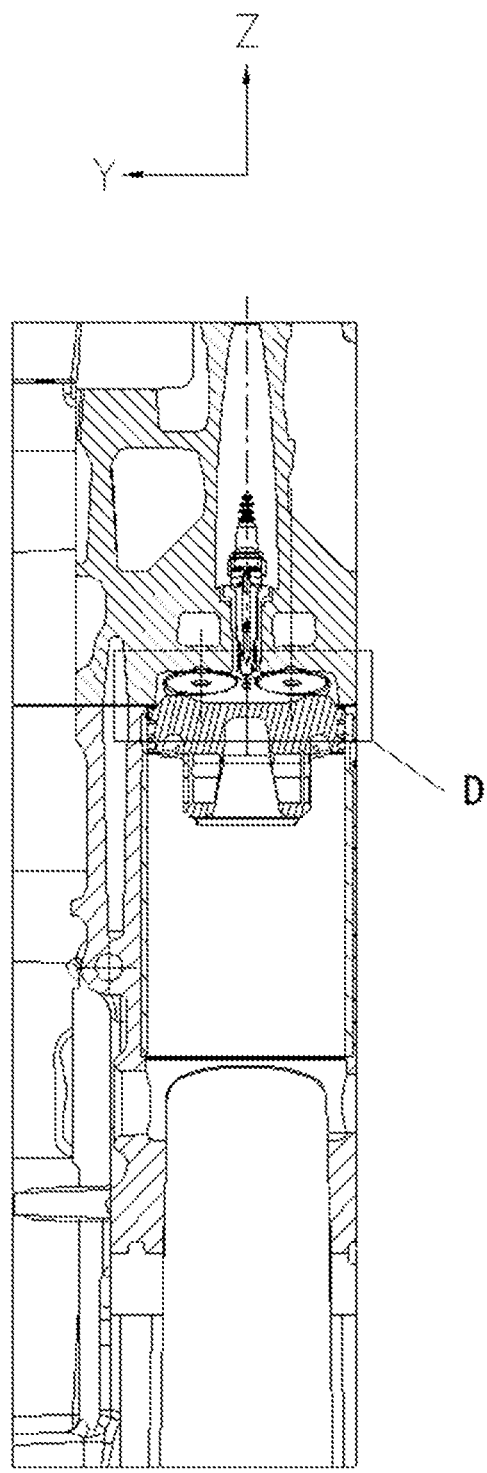
FIG. 13 is a schematic sectional view of an engine perpendicular to a first direction according to an embodiment of the present disclosure.
Figure 14:
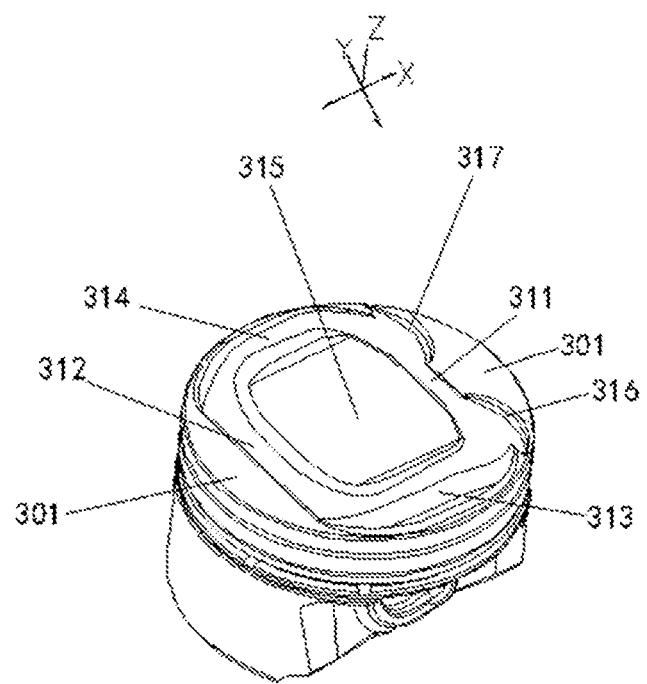
FIG. 14 is a schematic perspective view of a piston in an engine according to an embodiment of the present disclosure, viewed from a first perspective.
Figure 15:
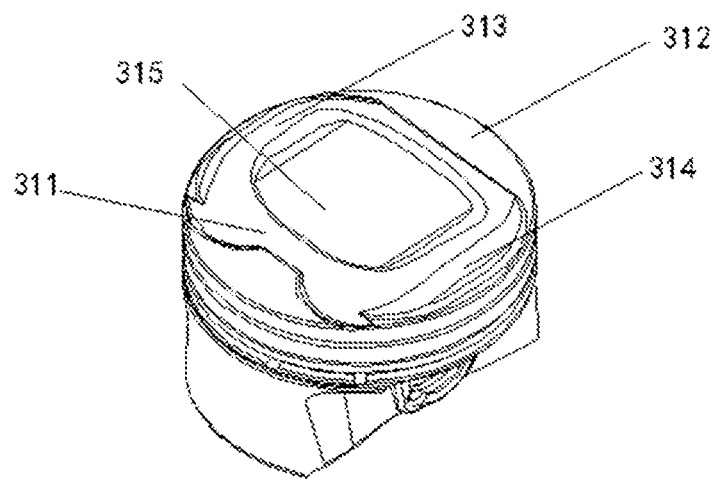
FIG. 15 is a schematic perspective view of a piston in an engine according to an embodiment of the present disclosure, viewed from a second perspective.
Figure 18:
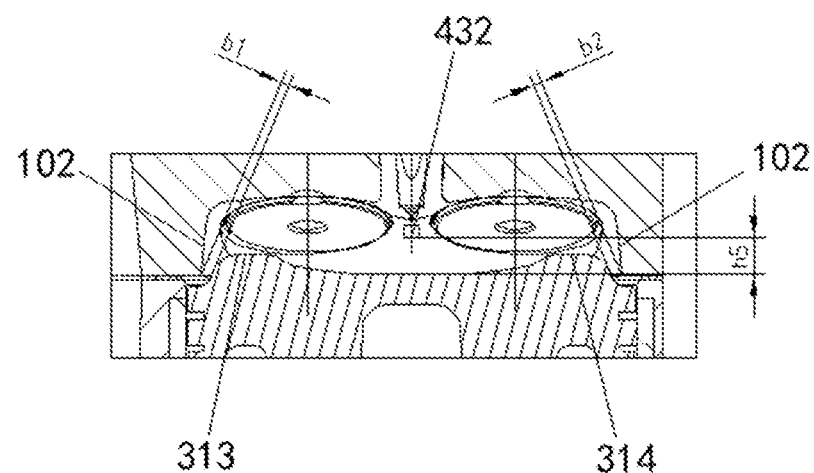
FIG. 18 is a schematic partial enlarged view of part D in FIG. 13.

In an embodiment, the piston 30 has an upper reference plane 301. The squishing and guiding structure is of a protruded shape relative to the upper reference plane 301 of the piston 30. The upper reference plane of the piston 30 may be a plane. The squishing and guiding structure includes a first squishing and guiding surface 311 and a second squishing and guiding surface 312 along the first direction (i.e., the X direction in FIG. 14). The first squishing and guiding surface 311 is closer to the intake valve 41 than the second squishing and guiding surface 312, and the second squishing and guiding surface 312 is closer to the exhaust valve 42 than the first squishing and guiding surface 311. In the same combustion chamber 101, an intake valve 41 and an exhaust valve 42 adjacent to each other are disposed in the first direction. In the same combustion chamber 101, one intake valve 41 and the other intake valve 41 are disposed in the second direction (i.e., the Y direction in FIG. 14). The first direction and the second direction are perpendicular to each other, and the first direction and the second direction and the height direction (the Z direction) are perpendicular to each other. The squishing and guiding structure includes a first squishing and guiding protruded structure 313 and a second squishing and guiding protruded structure 314 disposed along the second direction. The first squishing and guiding protruded structure 313 and the second squishing and guiding protruded structure 314 are protruded relative to the upper reference plane 301. The first direction and the second direction and the movement direction of the piston 30 (i.e., the height direction, the Z direction) are perpendicular to each other. The first squishing and guiding surface 311 is closer to the intake side than the second squishing and guiding surface 312, and the second squishing and guiding surface 312 is closer to the exhaust side than the first squishing and guiding surface 311. The first squishing and guiding protruded structure 313 is closer to the front end of the engine than the second squishing and guiding protruded structure 314, and the second squishing and guiding protruded structure 314 is closer to the rear end of the engine than the second squishing and guiding protruded structure 314. When the piston 30 is at the top dead center (as shown in FIG. 12 and FIG. 13), the squishing and guiding structure will move into the corresponding combustion chamber 101 of the cylinder head 20, thereby reducing the volume of the combustion chamber 101 and increasing the geometric compression ratio of the engine. Also, as shown in FIG. 18, when the piston 30 is at the top dead center, gaps b1 and b2 are present between the side wall 102 of the cylinder head combustion chamber and the squishing and guiding structure (the first squishing and guiding protruded structure 313 and the second squishing and guiding protruded structure 314 of the squishing and guiding structure). The gaps b1 and b2 are located at the edge of the combustion chamber 101 and can produce a squishing effect. By using the squishing and guiding structure and the squishing function, the turbulent kinetic energy at the edge of the combustion chamber 101 can be increased, so that the combustion speed is increased and the tendency of knock of an engine of high compression ratio is mitigated.

In an application, the first squishing and guiding protruded structure 313 and the second squishing and guiding protruded structure 314 in the front to rear direction (second direction) of the piston 30 may be structures that are symmetrical to each other.

In an application, the tops of the first squishing and guiding protruded structure 313 and the second squishing and guiding protruded structure 314 may be of a planar shape. The outer sides of the first squishing and guiding protruded structure 313 and the second squishing and guiding protruded structure 314 may be of a sloped shape, with rounded transition at the junction. It can be understood that rounded transition may also be adopted at the junction between the first squishing and guiding surface 311, the second squishing and guiding surface 312 and the upper reference plane 301.

In an embodiment, the top of the squishing and guiding structure includes a pit structure 315. The pit structure 315 is located between the first squishing and guiding protruded structure 313 and the second squishing and guiding protruded structure 314 and between the first squishing and guiding surface 311 and the second squishing and guiding surface 312. The pit structure 315 may be of a concave arc shape, which facilitates tumbling of the air flow so that the combustion speed can be increased. Furthermore, the pit structure 315 is concaved, which ensures the distance between the spark plug 43 and the piston top, facilitating preliminary formation of the fire core. In an embodiment, the pit structure 315 may be of a curved shape or a spherical shape or the like. In this embodiment, the pit structure 315 is of a concave arc shape, and the bottom of the pit structure 315 may be higher than the upper reference plane 301.

In an embodiment, the first squishing and guiding surface 311 and the second squishing and guiding surface 312 may be of a sloped shape, or a curved shape, or the like. The first squishing and guiding surface 311 includes an intake valve avoidance structure. In this embodiment, two intake valve avoidance structures are provided, including a front intake valve avoidance structure 316 and a rear intake valve avoidance structure 317. The front intake valve avoidance structure 316 and the rear intake valve avoidance structure 317 are disposed along the second direction at the junction between the first squishing and guiding surface 311 and the upper reference plane 301 to avoid interference with the intake valve 41. The number of the intake valve avoidance structures is equal to the number of the intake valves 41. If only one intake valve 41 is provided, then one intake valve avoidance structure is provided.

Figure 8:
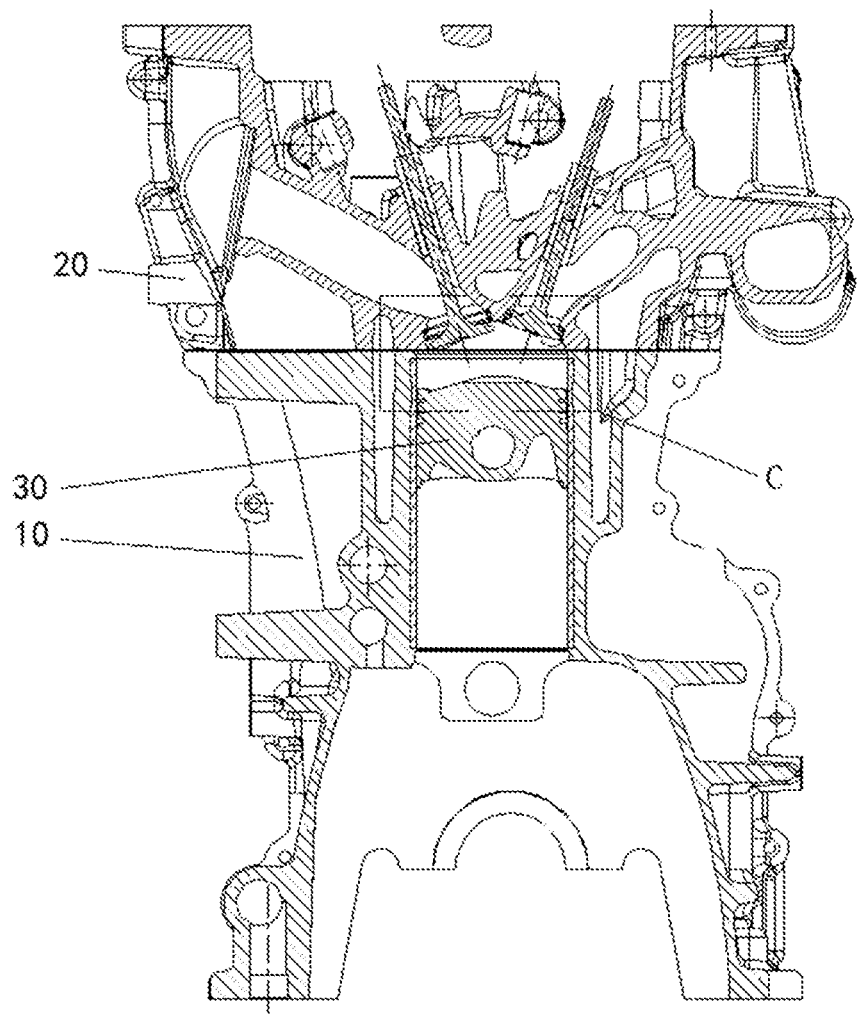
FIG. 8 is another schematic sectional view of an engine according to an embodiment of the present disclosure.

In an embodiment, when the piston 30 moves to the top dead center, the squishing and guiding structure extends into the combustion chamber 101 of the cylinder head 20, and the minimum distances between the first squishing and guiding protruded structure 313 and the second squishing and guiding protruded structure 314 and the side wall 102 of the corresponding combustion chamber of the cylinder head are both about 1 mm to about 2 mm (denoted by b1 and b2 in FIG. 8).

In an embodiment, when the piston travels to the top dead center, the minimum distance b1 between the first squishing and guiding protruded structure 313 (at the junction between the first squishing and guiding protruded structure 313 and the upper reference plane 301) and the cylinder head 20 may be equal to the minimum distance b2 between the second squishing and guiding protruded structure 314 and the cylinder head 20, which provides a good squishing and guiding effect and facilitates easy machining.

In this embodiment, the minimum distance b1 between the first squishing and guiding protruded structure 313 and the cylinder head 20 is about 1.56 mm.

In this embodiment, the minimum distance b2 between the second squishing and guiding protruded structure 314 and the cylinder head 20 is about 1.56 mm.

In an embodiment, the upper reference plane 301 may be of a planar shape. The included angle between the outer side of the first squishing and guiding protruded structure 313 and the upper reference plane 301 is the first included angle (denoted by β1 in FIG. 16), and the included angle between the second squishing and guiding protruded structure 314 and the upper reference plane 301 is the second included angle (denoted by β2 in FIG. 16). The first included angle and the second included angle are both about 100 degrees to about 120 degrees.

In an embodiment, the first included angle β1 is equal to the second included angle β2, which provides a good squishing and guiding effect and facilitates easy machining.

In this embodiment, the first included angle β1 is about 112.5 degrees.

In this embodiment, the second included angle β2 is about 112.5 degrees.

In an embodiment, the vertical distance between the top of the first squishing and guiding protruded structure 313 and the upper reference plane 301 is a first height h3, and the vertical distance between the top of the second squishing and guiding protruded structure 314 and the upper reference plane 301 is a second height h4. The first height h3 and the second height h4 are both about 4 to about 6 mm.

In an embodiment, the first height h3 is equal to the second height h4, which provides a good squishing and guiding effect and facilitates machining.

In this embodiment, the first height h3 is about 4.9 mm.

In this embodiment, the second height h4 is about 4.9 mm.

In an embodiment, a spark plug 43 is connected to the cylinder head 20, and the distance h5 between the bottom of the pit structure 315 (at the center) and the spark plug 43 is about 5.5 mm to about 6 mm (as shown in FIG. 18), facilitating preliminary formation of the fire core.

Figure 16:
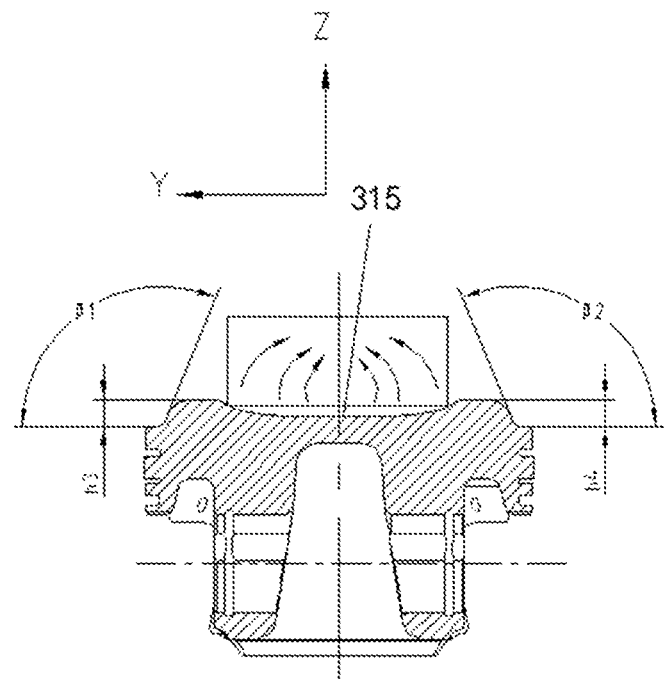
FIG. 16 is a schematic sectional view of a piston in an engine perpendicular to a first direction according to an embodiment of the present disclosure.
Figure 17:
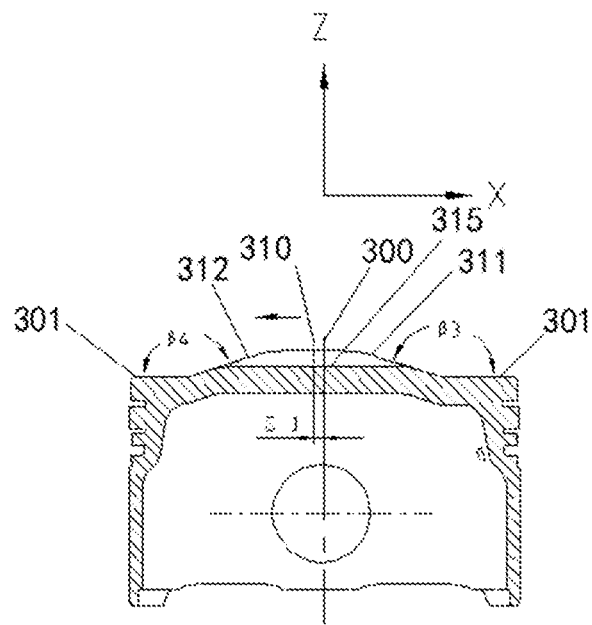
FIG. 17 is a schematic sectional view of a piston in an engine perpendicular to a second direction according to an embodiment of the present disclosure.

In an embodiment, as shown in FIG. 16, the bottom of the pit structure 315 is of a smooth curve shape along the section perpendicular to the first direction. As shown in FIG. 17, the bottom of the pit structure 315 is of a flattened shape along the section perpendicular to the second direction. Such a structure facilitates converging of the air flow toward the center along the front-rear direction of the cylinder in the vicinity of the compression top dead center so as to form a combustible gas mixture with suitable concentration, thereby facilitating ignition of the spark plug 43.

In an embodiment, in this embodiment, the first squishing and guiding surface 311 and the second squishing and guiding surface 312 are both of a sloped shape and the upper reference plane 301 is of a planar shape. The included angle between the first squishing and guiding surface 311 and the upper reference plane 301 is a third included angle β3, and the included angle between the second squishing and guiding surface 312 and the upper reference plane 301 is a fourth included angle β4. The third included angle β3 and the fourth included angle β4 are both about 160 degrees to about 170 degrees.

Figure 19:
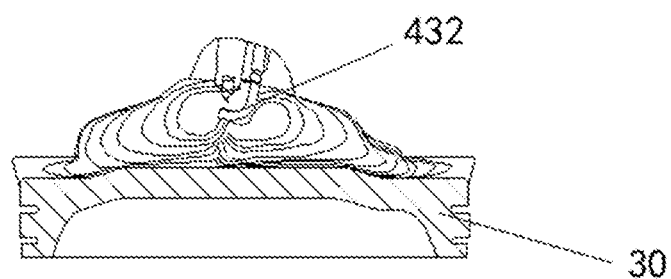
FIG. 19 is a schematic view showing the air flow between a piston and a spark plug in an engine according to an embodiment of the present disclosure.
Figure 20:
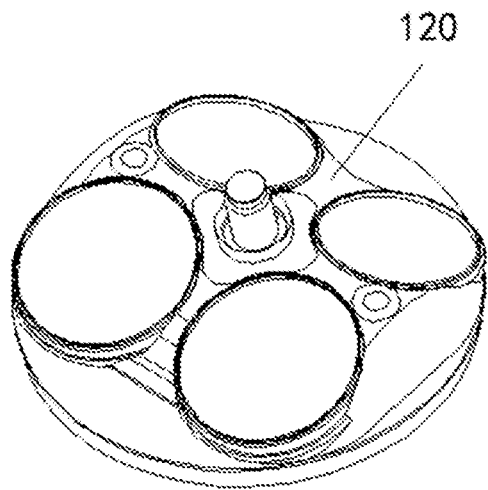
FIG. 20 is a schematic perspective view of a stereo-model for a combustion chamber in an engine according to an embodiment of the present disclosure.
Figure 21:
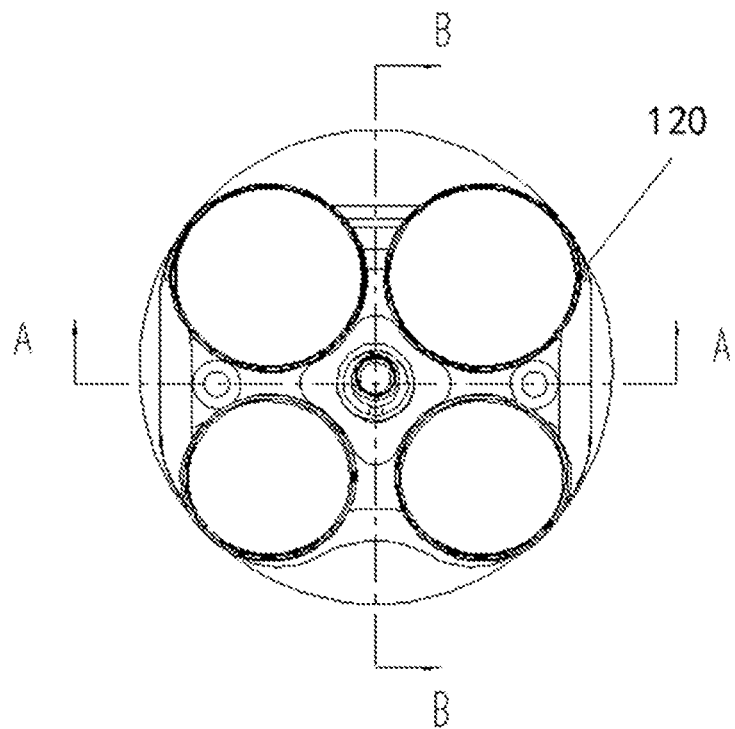
FIG. 21 is a schematic plan view of a stereo-model for a combustion chamber in an engine according to an embodiment of the present disclosure.
Figure 22:
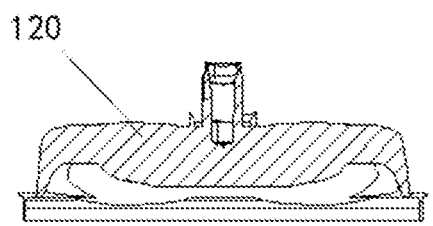
FIG. 22 is a schematic sectional view taken along A-A in FIG. 21.
Figure 23:
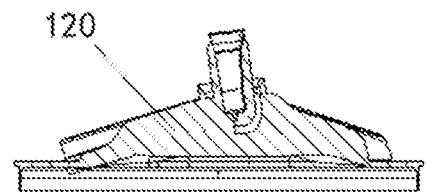
FIG. 23 is a schematic sectional view taken along B-B in FIG. 21.

In this embodiment, the third included angle β3 is about 163 degrees and the fourth included angle β4 is about 162 degrees. A 163° slope is adopted for the third included angle β3 close to the intake side and a 162° slope is adopted for the fourth included angle β4 close to the exhaust side. As such, on one hand, the intake and exhaust valves 42 can be avoided, ensuring a suitable gap to prevent physical interference; on the other hand, the air flow is enabled to form an approximately symmetrical dual-swirl squishing structure in the vicinity of the compression top dead center (as shown in FIG. 19), which, in conjunction with the flattened design for the pit structure 315 along the second direction, ensures that the speed of the nearby air flow is controlled to a suitable range<15 m/s at the moment of ignition, which facilitates the preliminary formation of the fire core and stability of flame propagation.

In an embodiment, as shown in FIG. 17, the center 310 of the squishing and guiding structure is offset from the center 300 of the piston along the first direction toward the side of the exhaust valve 42 by a set distance Si. That is, the protrusion in the top surface of the piston 30 is biased from the center of the piston 30 toward the exhaust side, as shown by the direction of the arrow in FIG. 17. Such an configuration facilitates increasing the air flow rate at the edge of the exhaust side, increasing the flame propagation speed, and significantly decreasing the probability of preignition and knock due to high temperature on the exhaust side.

As shown in FIG. 17, the outer sides of the first squishing and guiding protruded structure 313 and the second squishing and guiding protruded structure 314 form a steep flange on the top of the piston 30, thereby providing a significant squishing and guiding effects and facilitating shortening of the after-combustion period to improve the thermal efficiency of the engine.

In this embodiment, the combustion chamber 101 may be applied to an engine of high geometric compression ratio (i.e., a high efficiency engine). The engine may be used as an engine of high geometric compression ratio (i.e., a high efficiency engine). When the piston 30 moves to the vicinity of the compression top dead center, the spark plug 43 ignites so as to start the next stroke. The cylinder head 20 includes an intake valve 41, a quad exhaust valve 42, a measurement platform 204, and a barrier protrusion 21. There may be two intake valves 41 and two quad exhaust valves 42. The surface of the combustion chamber of the cylinder head may be a cast blank surface. To ensure the accurate measurements of the volume of the combustion chamber 101, the combustion chamber 101 is designed to have two measurement platforms 204 inside. In the process of blank production, the volume of the combustion chamber of the cylinder head is indirectly controlled by measuring the height from the measurement platforms 204 to the end surface of the cylinder block 10, so that unqualified products can be prevented from being released. The combustion chamber of the cylinder head is designed to have two barrier protrusions 21 on the intake valve 41 close to the bottom side of the cylinder head 20. The barrier protrusions 21 have a certain height so as to form a barrier to impede and guide the air flow. Due to the effect of the structure of the combustion chamber 101, the range of the wrap angle of the barrier protrusions 21 is configured ingeniously, so that the intake valve 41 can improve the tumble effect of the air flowing in the cylinder (such as the tumble direction of the air flow represented by the arrow in FIG. 9) during the small valve lift and consequently the combustion speed is increased, resulting in more complete combustion.

The piston 30 may be an Atkinson piston 30. The first squishing and guiding protruded structure 313 on the front side, the second squishing and guiding protruded structure 314 on the rear side, the front intake valve avoidance structure 316 on the front side, the rear intake valve avoidance structure 317 on the rear side, the upper reference plane 301 of the piston 30 and the first squishing and guiding surface 311 of the piston 30 close to the intake side form jointly an intake-gas squishing and guiding device that provides reasonable tumble and swirl for combustion. The pit structure 315 on the top of the piston 30, while participating in squishing and guiding, provides a reasonable ignition gap for the side electrode 432 of the spark plug 43, which facilitates formation of the flame core and stability of the ignited gas mixture. The upper reference plane 301 of the piston 30, the second squishing and guiding surface 312 of the piston 30 close to the exhaust side and the pit structure 315 on the top of the piston 30 provide jointly squishing and guiding for the exhaust gas. FIG. 20 to FIG. 23 show schematic perspective views of a stereo-model for a combustion chamber.

An embodiment of the present disclosure further provides a vehicle having the engine described above.

In the engine and the vehicle having the engine according to embodiments of the present disclosure, a barrier protrusion 21 disposed at the intake valve hole 201 serves to impede and guide the air flow, so that the tumble effect of the air flow in the cylinder (the combustion chamber 101) is improved, resulting in a high tumble ratio, so that the combustion speed is increased, and more complete combustion is achieved and the after-combustion period is shortened, thereby facilitating improvement in the thermal efficiency of the engine. Also, in the squishing and guiding structure of the piston 30, the first squishing and guiding protruded structure 313 on the front side, the second squishing and guiding protruded structure 314 on the rear side, the front intake valve avoidance structure 316 on the front side, the rear intake valve avoidance structure 317 on the rear side, the upper reference plane 301 of the piston 30 and the first squishing and guiding surface 311 of the piston 30 close to the intake side form jointly an intake-gas squishing and guiding device that provides reasonable tumble and swirl for combustion. The pit structure 315 on the top of the piston 30, while participating in squishing and guiding, provides a reasonable ignition gap for the side electrode 432 of the spark plug 43, which facilitates formation of the flame core and stability of the ignited gas mixture. The upper reference plane 301 of the piston 30, the second squishing and guiding surface 312 of the piston 30 close to the exhaust side and the pit structure 315 on the top of the piston 30 provide jointly squishing and guiding for the exhaust. With the structure described above and the squishing function thereof, the turbulent kinetic energy at the edge of the combustion chamber can be increased, so that the combustion speed can be increased and the tendency of knock of an engine of high compression ratio can be mitigated. Meanwhile, the barrier protrusion structure disposed on the cylinder head increases the tumble ratio and consequently increases the combustion speed. With both configurations, the after-combustion period is shortened, and the thermal efficiency of the engine is improved.

Described above are merely preferred embodiments of the present disclosure, which are not intended to limit the present disclosure. Any modification, equivalent replacement or improvement made within the spirit and principle of the present disclosure shall fall within the protection scope of the present disclosure.

What is claimed is:

1. An engine, comprising a cylinder block, a cylinder head, and a piston,
   the cylinder head connected to the cylinder block, the piston being movably connected to the cylinder block, and the cylinder block, the cylinder head, and the piston forming a combustion chamber; and
   the cylinder head comprising an intake valve hole and an exhaust valve hole, an intake valve disposed at the intake valve hole, an exhaust valve disposed at the exhaust valve hole, a barrier protrusion protruding at an edge of the intake valve hole away from the exhaust valve hole, an included angle between a first connecting line connecting a first end of the barrier protrusion and a center of the intake valve hole and a second connecting line connecting a second end of the barrier protrusion and the center of the intake valve hole being greater than about 120 degrees and less than or equal to about 180 degrees,
   wherein the engine further comprises a squishing and guiding structure disposed on a top surface of the piston, wherein a top surface of the squishing and guiding structure includes a concaved pit structure.

2. The engine according to claim 1, wherein a gap between an outer circumference of the intake valve and the barrier protrusion is about 0.5 mm to about 1 mm.

3. The engine according to claim 1, wherein a height by which the intake valve is protruded from the intake valve hole is a head height of the intake valve, and a distance between halfway of the head height of the intake valve and an end surface of the barrier protrusion in a direction of an axis of the intake valve is about 2 mm to about 3 mm.

4. The engine according to claim 1, comprising at least two combustion chambers including the combustion chamber,
   for each of the at least two combustion chambers:
   the cylinder head comprising a spark plug hole, two intake valve holes, and two exhaust valve holes; and
   the two intake valve holes being adjacent to each other on a first side of the spark plug hole at a center of the combustion chamber, the two exhaust valve holes being adjacent to each other on a second side of the spark plug hole at the center of the combustion chamber, and barrier protrusions disposed on the two intake valve holes symmetrically.

5. The engine according to claim 4, wherein a straight line passing through centers of the two intake valve holes is a reference axis, the barrier protrusions are located on a side of the reference axis away from the exhaust valve holes, and ends of the barrier protrusions are at a same side of the reference axis.

6. The engine according to claim 5, wherein a first end of a first barrier protrusion at a first intake valve hole is close to a second intake valve hole, a second end of the first barrier protrusion at the first intake valve hole is away from the second intake valve hole, and a vertical distance from the first end of the first barrier protrusion to the reference axis is greater than a vertical distance from the second end of the first barrier protrusion to the reference axis.

7. The engine according to claim 1, wherein the cylinder head comprises at least two measurement platforms.

8. The engine according to claim 1, wherein
the squishing and guiding structure is protruded from the top surface of the piston;
the squishing and guiding structure comprises a first squishing and guiding surface and a second squishing and guiding surface disposed along a first direction, the first squishing and guiding surface is closer to the intake valve than the second squishing and guiding surface, and the second squishing and guiding surface is closer to the exhaust valve than the first squishing and guiding surface; and
the squishing and guiding structure comprises a first squishing and guiding protruded structure and a second squishing and guiding protruded structure disposed along a second direction, and the first direction is perpendicular to the second direction.

9. The engine according to claim 8, wherein the concaved pit structure is located between the first squishing and guiding protruded structure and the second squishing and guiding protruded structure.

10. The engine according to claim 9, wherein
the first squishing and guiding surface and the second squishing and guiding surface are of a sloped shape or a curved shape; and
an intake valve avoidance structure is disposed on the first squishing and guiding surface.

11. The engine according to claim 9, wherein when the piston moves to a top dead center, the squishing and guiding structure extends into the combustion chamber of the cylinder head, and a minimum distance between the first squishing and guiding protruded structure and a side wall of a corresponding combustion chamber of the cylinder head and a minimum distance between the second squishing and guiding protruded structure and a side wall of a corresponding combustion chamber of the cylinder head are both about 1 mm to about 2 mm.

12. The engine according to claim 9, wherein the top surface of the piston is of a planar shape, an included angle between an outer side of the first squishing and guiding protruded structure and the top surface of the piston is a first included angle, and an included angle between an outer side of the second squishing and guiding protruded structure and the top surface of the piston is a second included angle, and each of the first included angle and the second included angle is about 100 degrees to about 120 degrees.

13. The engine according to claim 9, wherein a vertical distance between a top surface of the first squishing and guiding protruded structure and the top surface of the piston is a first height, a vertical distance between a top surface of the second squishing and guiding protruded structure and the top surface of the piston is a second height, and each of the first height and the second height is about 4 mm to about 6 mm.

14. The engine according to claim 9, wherein a spark plug is connected to the cylinder head and a distance between a bottom of the concaved pit structure and the spark plug is about 5.5 mm to about 6 mm.

15. The engine according to claim 9, wherein a bottom of the concaved pit structure is of a smooth curve shape along a cross section perpendicular to the first direction; and the bottom of the concaved pit structure is of a flattened shape along a cross section perpendicular to the second direction.

16. The engine according to claim 9, wherein the first squishing and guiding surface and the second squishing and guiding surface are of a sloped shape, the top surface of the piston is of a planar shape, an included angle between the first squishing and guiding surface and the top surface of the piston is a third included angle, an included angle between the second squishing and guiding surface and the top surface of the piston is a fourth included angle, and each of the third included angle and the fourth included angle is about 160 degrees to about 170 degrees.

17. The engine according to claim 9, wherein a center of the squishing and guiding structure is offset from a center of the piston toward the exhaust valve in the first direction.

18. A vehicle, comprising an engine comprising a cylinder block, a cylinder head, and a piston,
the cylinder head connected to the cylinder block, the piston being movably connected to the cylinder block, and the cylinder block, the cylinder head, and the piston forming a combustion chamber; and
the cylinder head comprising an intake valve hole and an exhaust valve hole, an intake valve disposed at the intake valve hole, an exhaust valve disposed at the exhaust valve hole, a barrier protrusion protruding at an edge of the intake valve hole away from the exhaust valve hole, an included angle between a first connecting line connecting a first end of the barrier protrusion and a center of the intake valve hole and a second connecting line connecting a second end of the barrier protrusion and the center of the intake valve hole being greater than about 120 degrees and less than or equal to about 180 degrees,
wherein the engine further comprises a squishing and guiding structure disposed on a top surface of the piston, wherein a top surface of the squishing and guiding structure includes a concaved pit structure.

\* \* \* \* \*

UNITED STATES PATENT AND TRADEMARK OFFICE
CERTIFICATE OF CORRECTION

| | |
|---|---|
| PATENT NO. | : 11,952,957 B2 |
| APPLICATION NO. | : 18/214429 |
| DATED | : April 9, 2024 |
| INVENTOR(S) | : Qiang Wang et al. |

Page 1 of 1

It is certified that error appears in the above-identified patent and that said Letters Patent is hereby corrected as shown below:

In the Specification

In Column 7, Line 19, that reads "height HO from the measurement platforms" should read – height H0 from the measurement platforms –

In Column 10, Line 35, that reads "the exhaust valve 42 by a set distance Si." should read – the exhaust valve 42 by a set distance S1. –

Signed and Sealed this
Sixth Day of May, 2025

Coke Morgan Stewart
*Acting Director of the United States Patent and Trademark Office*